United States Patent
Kostreski et al.

[11] Patent Number: 5,651,010
[45] Date of Patent: *Jul. 22, 1997

[54] SIMULTANEOUS OVERLAPPING BROADCASTING OF DIGITAL PROGRAMS

[75] Inventors: Bruce Kostreski, Wheaton, Md.; Kamran Sistanizadeh, Arlington; W. Tim Cambell, Alexandria, both of Va.

[73] Assignee: Bell Atlantic Network Services, Inc., Arlington, Va.

[*] Notice: The term of this patent shall not extend beyond the expiration date of Pat. No. 5,563,892.

[21] Appl. No.: 405,558

[22] Filed: Mar. 16, 1995

[51] Int. Cl.$^6$ .................. H04J 3/00; H04B 7/015
[52] U.S. Cl. .................. 370/537; 348/423; 348/614
[58] Field of Search .................. 370/50, 69.1, 73, 370/84, 112, 32.1, 108, 100.1; 348/7, 607, 12, 614, 13, 358, 21, 423, 385, 387, 723; 455/4.1, 4.2, 3.1, 51.1, 51.2; 375/229, 230, 346, 349

[56] References Cited

U.S. PATENT DOCUMENTS

| | | | |
|---|---|---|---|
| 2,458,124 | 1/1949 | Wilmotte | 348/723 |
| 2,629,816 | 2/1953 | Rabuteau . | |
| 3,836,726 | 9/1974 | Wells et al. . | |
| 4,255,814 | 3/1981 | Osborn | 455/51.1 |
| 4,718,109 | 1/1988 | Breeden et al. | 455/51.1 |
| 4,769,833 | 9/1988 | Farleigh et al. | 379/105 |
| 5,038,403 | 8/1991 | Leitch | 455/51.2 |
| 5,111,298 | 5/1992 | Koo | 348/614 |
| 5,117,503 | 5/1992 | Olson | 455/51.1 |
| 5,119,196 | 6/1992 | Ayanoglu et al. | 348/607 |
| 5,121,208 | 6/1992 | Citta et al. | 348/607 |
| 5,127,101 | 6/1992 | Rose, Jr. | 455/51.1 |
| 5,128,925 | 7/1992 | Dornstetter et al. | 370/17 |
| 5,230,086 | 7/1993 | Saul | 455/51.1 |
| 5,231,494 | 7/1993 | Wachob | 455/6.1 |
| 5,239,671 | 8/1993 | Linquist et al. | 455/13.1 |
| 5,239,672 | 8/1993 | Kurby et al. | 455/16 |
| 5,243,598 | 9/1993 | Lee | 370/95.3 |
| 5,268,933 | 12/1993 | Averbuch | 455/51.1 |
| 5,274,666 | 12/1993 | Dowdell et al. | 455/51.1 |
| 5,355,529 | 10/1994 | Linquist et al. | 455/13.1 |
| 5,404,575 | 4/1995 | Lehto | 455/51.1 |
| 5,412,426 | 5/1995 | Totty | 348/723 |

Primary Examiner—Douglas W. Olms
Assistant Examiner—Chau T. Nguyen
Attorney, Agent, or Firm—Lowe, Price, LeBlanc & Becker

[57] ABSTRACT

Within a desired service area, multiple transmitters at separately located sites simultaneously broadcast the same multichannel, multi-program signal. Broadcast waves from the transmitters propagate throughout substantially overlapping portions of the service area. Obstructions in the service area, e.g. mountains, buildings, trees, etc., may block reception from one or more of the transmitters at certain sites. However, at most receiving sites, the receiving antenna can receive a clear line-of-sight transmission from at least one of the transmitters. In the preferred implementation, the channels are 6 MHz wide channels broadcast in the super high frequency microwave portion of the spectrum. Each such channel carries a multiplexed digital data stream containing packets of information for a plurality of programs, e.g. television programs.

39 Claims, 9 Drawing Sheets

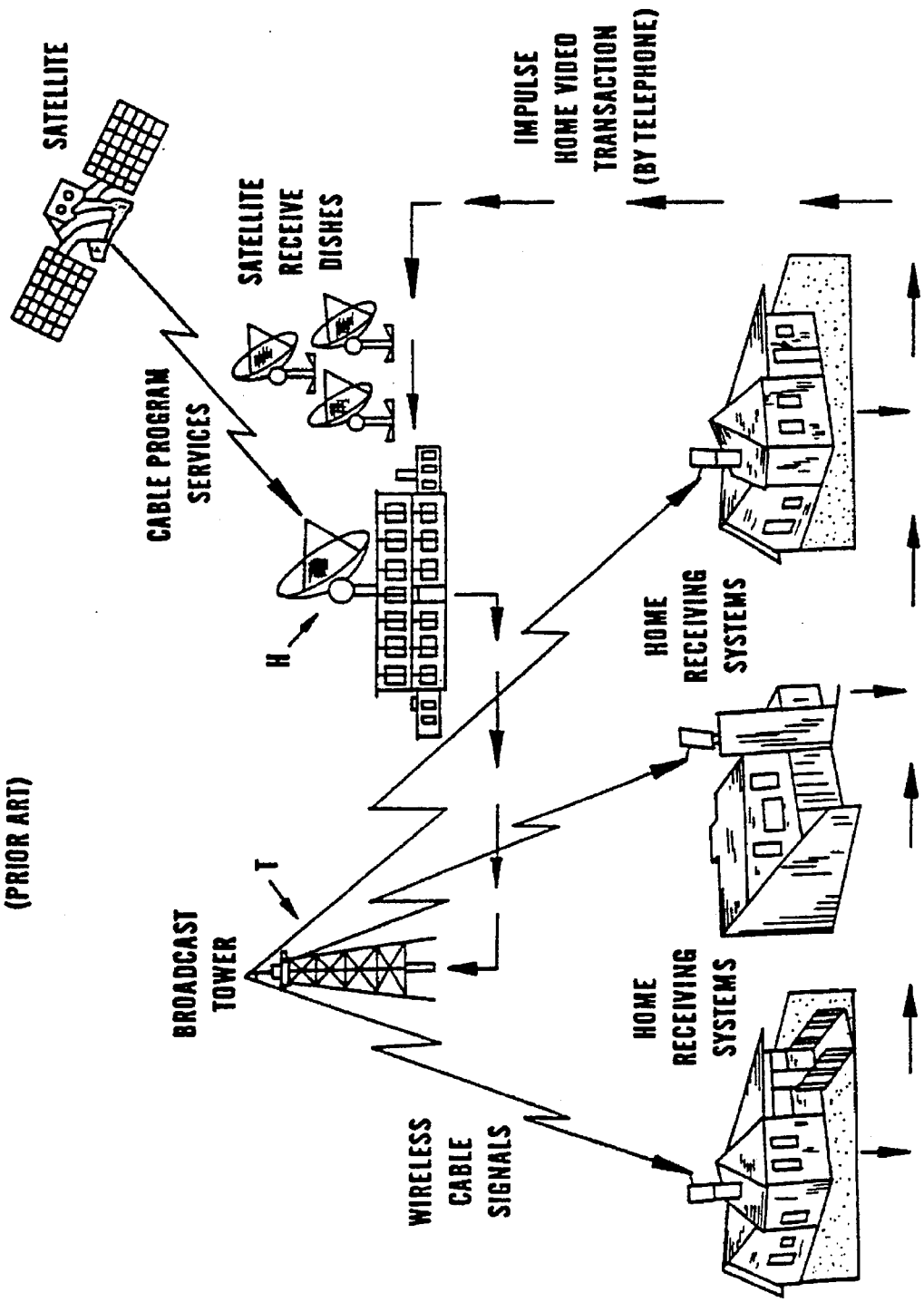

1

SIMULTANEOUS OVERLAPPING BROADCASTING OF DIGITAL PROGRAMS

TECHNICAL FIELD

The present invention relates to wireless distribution of program information, e.g. video, audio and data. More specifically, the present invention relates to simultaneous distribution of multiple RF channels from separately located transmitters, each RF channel carrying a digital transport stream containing multiplexed data relating to a plurality of different programs.

BACKGROUND ART

"Wireless cable" is a term usually used to refer to a multi-channel video distribution medium that resembles franchise cable television, but which uses microwave channels rather than coaxial cable or wire to transmit programming to the subscriber. Programming for wireless cable systems is received at the headend of the wireless cable system in the same manner as it is for landline based cable television. These programs are then re-transmitted, utilizing the high end of the Ultra High Frequency (UHF) portion of the microwave radio frequency spectrum (2.1 to 2.7 GHz), by a microwave transmitting antenna located on a tower or other tall structure to small antennas on subscriber rooftops, typically within a 40 mile radius. As a general matter, the transmission of wireless frequencies requires clear line-of-sight (LOS) between the transmitter and the receiving antenna. Buildings, dense foliage and topography can cause signal interference which can diminish or block signals. Certain LOS constraints can be reduced by increasing transmission power and using engineering techniques such as pre-amplifiers and signal repeaters.

To the subscriber, wireless cable operates as a cable look-alike service. At the subscriber's location, microwave signals are received by an antenna, down-converted and passed through conventional coaxial cable to a descrambling converter located on top of a television set. The signals are converted at the antenna location to lower frequencies in order to be carried over conventional in-house cable to a converter box, decoded and then output to a standard television set. Because wireless cable signals are transmitted over the air rather than through underground or above-ground cable networks, wireless systems are less susceptible to outages and are less expensive to operate and maintain than franchise cable systems. Most service problems experienced by wireless cable subscribers are home-specific rather than neighborhood-wide, as is frequently the case with franchise cable systems.

The evolution of wireless cable may be briefly summarized as follows. Wireless cable technology has existed in a single channel version for commercial purposes since the 1970's and had been available even longer for educational use. In mid-1983, the FCC, invoking the need to promote competition with conventional cable television systems, established a change in the rules for using a portion of the microwave spectrum previously designated for educational use. In the past, 28 microwave channels had been available to accredited and non-profit educational organizations for educational use exclusively by Instructional Television Fixed Service (ITFS) operators. Rules reallocated eight of those channels for outright commercial use, and educational organizations were permitted to lease excess hours to commercial operators on the remaining 20 channels. In any local market, this makes it possible for a commercial operator to combine any or all of those 28 channels with five other channels already available for commercial use. Under current FCC rules, the available spectrum results in a maximum of 33 analog channels. This number of 'wireless cable' channels is less than the number offered on many competing franchise type cable television systems.

The 33 channels potentially available to wireless cable operators thus are subdivided into two types of channels. Twenty channels are referred to as ITFS. The remaining 13 channels are generally referred to as Multi-channel Multi-point Distribution Service (MMDS).

Since 1983 spectrum blocks in the 2.1–2.7 GHz range have been allocated for the purpose of delivering video content from a single transmit site to multiple receive locations. A total of 198 Mhz has been allocated for downstream transmissions for the wireless cable service. The channelization and transmission modulation (6 Mhz amplitude modulation/vestigial side band) are equivalent to broadcast TV or cable but up-converted to microwave frequencies.

The current UHF spectrum was originally licensed in blocks of four video channels each separately licensed, with each block allocated to a specific purpose. Five groups, each with four channels, were allocated to Instructional Television Fixed Service (ITFS). ITFS spectrum was initially made available only to educational institutions. Two groups of four channels were made available to anyone wishing to provide an alternative multi-channel video program service. The final four channels were licensed individually to institutions for the purpose of providing a private video network. Over time, the FCC relaxed some of these operational rules. Through licensing and leasing arrangements, the FCC now allows all of the channels to be aggregated for the purpose of providing an alternative to cable television.

In many ways, current typical UHF wireless TV is equivalent to a low tier franchise cable television system (i.e. having relatively few channels), with the only real difference lying in the medium used to transport signals from the headend to the customer. Functionally identical headend equipment is utilized in both systems. In the case of UHF service, signals leave the headend via a microwave transmitter. With cable television, the same signals leave the headend on fiber or coaxial cable facilities.

Wireless cable technology provides a relatively low cost medium to transmit video and does not require extensive coaxial cable networks, amplifiers and related equipment. The three major advantages of such service are variable cost technology where capital is spent in establishing cash flows, manageable financial risk because of variable costs, and the possibility of establishing broad based market entry more quickly than is feasible with wireline based video systems. Wireless cable systems are attractive to potential subscribers not yet served by franchise cable operators and can provide customers in cabled areas with an economical alternative to both existing franchise cable and satellite television reception systems. However, the current analog technology presents several problems which have severely limited actual use of 'wireless cable'.

In a typical prior art system, such as shown in FIG. 1, a headend system H receives up to a maximum of 33 analog television program signals from a variety of satellite downlink receivers and other types of receivers, in the exact same manner as for a cable television system. The headend system H frequency multiplexes those television program signals into a combined spectrum signal in the 50–450 Mhz range. This combined signal has a frequency distribution similar to that found on a cable television network. The headend system upconverts the combined spectrum signal to the UHF frequency range, typically centered around 2.6 GHz. The headend system supplies the UHF signal to a single transmitter antenna tower T which broadcasts the signal to subscribers who each have an individual home receiving system. Subscribers can call in to the headend to order pay-per-view events via the telephone network, and the headend transmits codes to the subscribers systems to enable descrambling of encoded pay-per-view programs.

FIG. 1A shows a typical service area for a wireless cable type system of the type shown in FIG. 1. In accord with relevant regulations, the wireless cable operator has a protected or 'primary' reception area P. At the relevant frequencies here under consideration, the primary area P is a circle having a radius of 15 miles from the operator's transmitter T. Within this area, the operator is guaranteed that there will be no interference with his transmissions on the assigned frequency channel(s). However, at the allowable power levels, the transmissions from antenna tower T will propagate out over a secondary area S having a radius of up to 40 miles. Within the secondary area, some locations will receive sufficient signal strength to utilize the wireless cable services.

UHF signals in the relevant frequency band arrive at the customer location by direct line-of-sight (LOS) transmission. Typically an elliptical dish shaped antenna 18–36 inches long, formed of parallel curved elements, is aimed from the subscriber location to receive the strongest signal from the transmitter. The captured signals are down-converted at the antenna from the microwave band to the broadcast band and transmitted via coaxial wiring into the house. For scrambled signals (the typical case), a set top converter functionally similar to a cable set top box is used. In many UHF installations, to conserve UHF capacity for premium services, a VHF/UHF off-air broadcast receive antenna is installed with the uHF antenna to pick up the local programming.

Propagation characteristics at the relevant UHF operating frequencies require line-of-sight (LOS) between the transmit and receive antennas for reliable service reception. Both natural obstructions such as hills and vegetation, and man-made obstructions such as buildings, water towers and the like, limit the actual households capable of receiving an LOS transmission. FIG. 1A also shows a simplified example of one such obstruction O. As illustrated, the obstruction O is within the primary reception area P. The obstruction blocks line-of-sight transmissions from transmitter antenna tower T in a radially extending blockage or shadow area B. Receiving systems within this area can not receive the transmissions from antenna T, and potential customers in that area B can not subscribe to the wireless cable services broadcast from that tower.

One solution to the blockage problem has been to provide repeaters. A repeater receives the primary transmission from tower T on the tower side of the obstruction, amplifies the signal if necessary, and retransmits the signal into the area of blockage. This may be an effective solution to one blockage or obstruction O, but in many major metropolitan areas there are many obstructions. The power levels of such repeaters tend to be low, and overcoming blockages due to distortions that result when amplifying combined RF channels caused by many different obstructions to the primary transmissions would require an inordinate number of repeaters. Also, because of delays and multipath effects, repeater transmissions may interfere with reception from the primary source in areas close to the blockage area B.

In the industry, a nominal figure for households reachable by LOS is 70%, even with a small, commercially practical number of repeaters. This projected number is based solely on computer models, not actual field measurements. It is believed that actual coverage by the current wireless cable technology in the UHF medium is considerably lower. Typical antenna heights required to achieve the present level of coverage in commercial service are 800-plus feet for transmitters and 30–60 feet for receivers. That means that many receive antennas must be mounted atop masts or nearby trees as an alternative to a rooftop mounting. While current regulations provide a 15 mile protected service area for MMDS, it is desired that effective system coverage for approximately 40–70% of the affected households may be achieved to a 40 mile radius from the transmitter antenna.

Besides signal blockage, several other propagation factors can affect reliable UHF service delivery. One factor is multi-path reflections of the desired signal arriving at the receiver by way of differing paths and therefore arriving with slight delay. For analog video signals, multi-path appears as ghost images on the viewer's TV. For digital signals, multi-path can cause intersymbol interference that results in multiple bit errors. In either case, near-coincident multi-path signals can cause a degree of signal cancellation that looks like additional propagation loss. Multi-path also results from reflections and diffraction.

Path fading is another significant coverage factor. Time-variant path fading can result from atmospheric effects, e.g., rain or temperature and pressure inversions. Rain can act to partially reflect or absorb the microwave signals. Weather inversions can result in an upward bending of the wave front due to refraction. There are engineering measures to mitigate the troublesome effects of time-variant path fading, such as suitable fade margins and antenna diversity.

In the paging and radio communication fields, various systems of sequencing and simulcasting have been proposed to achieve some increased coverage. Examples of typical proposed systems are illustrated in FIG. 2 and 3. The related systems are described in U.S. Pat. Nos. 3,836,726, issued September 1974 and 5,038,403 issued Aug. 6, 1991. FIG. 2 illustrates a system utilizing sequencing while FIG. 3 illustrates a system utilizing simulcasting. As can be seen, the aim is to cover maximum area with minimum area of signal overlap. Even if someone suggested application to UHF Wireless Cable type communications, such propagation fields would still exhibit the above noted problems due to obstructions, multi-path interference and fading.

Clearly a need exists for a broadcast system providing increased propagation coverage and reduced areas of blockages. Any such system should also provide an increased number of programs, without requiring additional spectrum allocation. The system should provide good signal quality throughout the entire reception area or service area. Accordingly, it is also desirable to minimize multipath interference and loss of service due to fading.

DISCLOSURE OF THE INVENTION

The present invention provides methods and apparatus to address the above stated needs. The present invention contemplates an RF frequency simulcasting method for transmitting information from multiple spaced transmitting sites to multiple receiving sites in a reception area. A signal including multiplexed channels is transmitted simultaneously from a plurality of spaced transmitting sites. The transmitting sites propagate the signal into substantially overlapping regions of at least a major portion or the intended reception area. At the subscriber premises, a terminal device receives a signal containing a plurality of time delayed copies of the transmitted signal. At least a portion of the received signal is processed to acquire a single copy of a signal corresponding to a selected one of the multiplexed channels, and information contained in the acquired signal is presented, e.g. in a form that is sensorially perceptible to a user. In the preferred embodiments, the processing of multiple copies utilizes a delay equalization technique.

The overlapping transmission or propagation areas reduce or eliminate blockage zones and effects of fading. This technique also limits the number of receivers effected by equipment outages. Typically, a directional receiving antenna can be aimed toward at least one strong line-of-sight transmission source.

To increase the number of programs broadcast by a system operating in accord with the above simulcasting method, each of the multiplexed channels carries a multiplexed stream of digital data representing a plurality of programs. The programs may be audio or data, but in the currently preferred embodiment, the programs comprise audio/visual information such as television programming. In such a television system, each program is digitally encoded into compressed digital data. A multiplexer combines the compressed digital data for a group of programs into one of the digital multiplexed data streams for transport through one of the channels. The presentation of one program to a user entails selecting one of the channels, selecting data from the multiplexed stream of digital data carried in that channel, and reproducing the selected data as the sensorially perceptible information, e.g. as an audio/visual output through a television set.

In an exemplary implementation of the present invention, real-time encoders receive video programs and encode the information for those programs into packets of compressed digital data, e.g. in accord with a recognized video compression standard. The headend may also receive previously encoded video program material from other sources, such as a digital server or a digital transmission media. Multiplexers combine digital data for groups of programs into the multiplexed packet data streams. A digital modulator, such as a 64 or 256 QAM modulator, modulates each digitally multiplexed packet data stream for transport in one unique RF channel. A combined spectrum signal containing the RF channels is upconverted to place the channels into available frequency channels in the UHF range.

The combined spectrum signal is supplied to a plurality of microwave broadcast transmitters located at spaced apart sites about the service area or reception region. Appropriate delays are imposed in one or more of the lines to the transmitters so that the transmissions from all the transmitter antennae occur simultaneously and in phase with each other.

At the receiver site, an antenna receives a signal from at least one of the transmitters. Preferably, the antenna is a directional antenna aimed at one of the transmitters for line-of-sight reception therefrom. The signal from the receiving antenna is downconverted and supplied to a wireless signal processor. The wireless signal processor, typically part of an interface module connected by a cable to the downconverter, processes the received wireless signal to select one of the channels. The wireless signal processor effectively acquires a digital multiplexed data stream from the selected channel and supplies that data stream to a digital signal processor.

The digital signal processor selects packets of data relating to a selected one of the programs. The digital processing section processes the compressed, digitized data from those packets to produce signals presentable to a user. In the preferred embodiment, the digital signal processor produces signals to drive a standard television set.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 1 is a simplified diagram of a prior art wireless cable television system.

BEST MODE FOR CARRYING OUT THE INVENTION

In accord with the present invention, groups of program signals are digitally encoded and compressed, and the compressed program streams are time division multiplexed into digital transport streams. Each digital transport stream is modulated and/or upconverted into one RF channel, in the preferred embodiment a channel in the high end of the ultra high frequency (UHF) microwave range (e.g. 2.1 to 2.7 GHz), although other frequency channels could be used. Separately located transmitters simultaneously broadcast an UHF frequency signal containing all of the channels. The transmitter antennae are located and the transmitter emission patterns are designed so that the waves from the transmitters propagate throughout substantially overlapping portions of the service area.

The overlapping portions may extend throughout the intended reception area. Existing regulations relating to the relevant frequency allocations specify a primary service area and a secondary service area. Within the primary service area, the regulations protect the licensee from any interference on the relevant frequency channel. In initial implementations of the present invention complying with such regulations, the overlapping areas of propagation from the multiple transmitters would cover at least a major portion of the primary reception area and preferably also cover a substantial portion of the secondary reception area. Some portions of the secondary reception area may be covered by propagating waves from only one of the transmitters. All of the primary and secondary areas would be covered by propagating waves from at least one of the transmitters.

Figure 4:
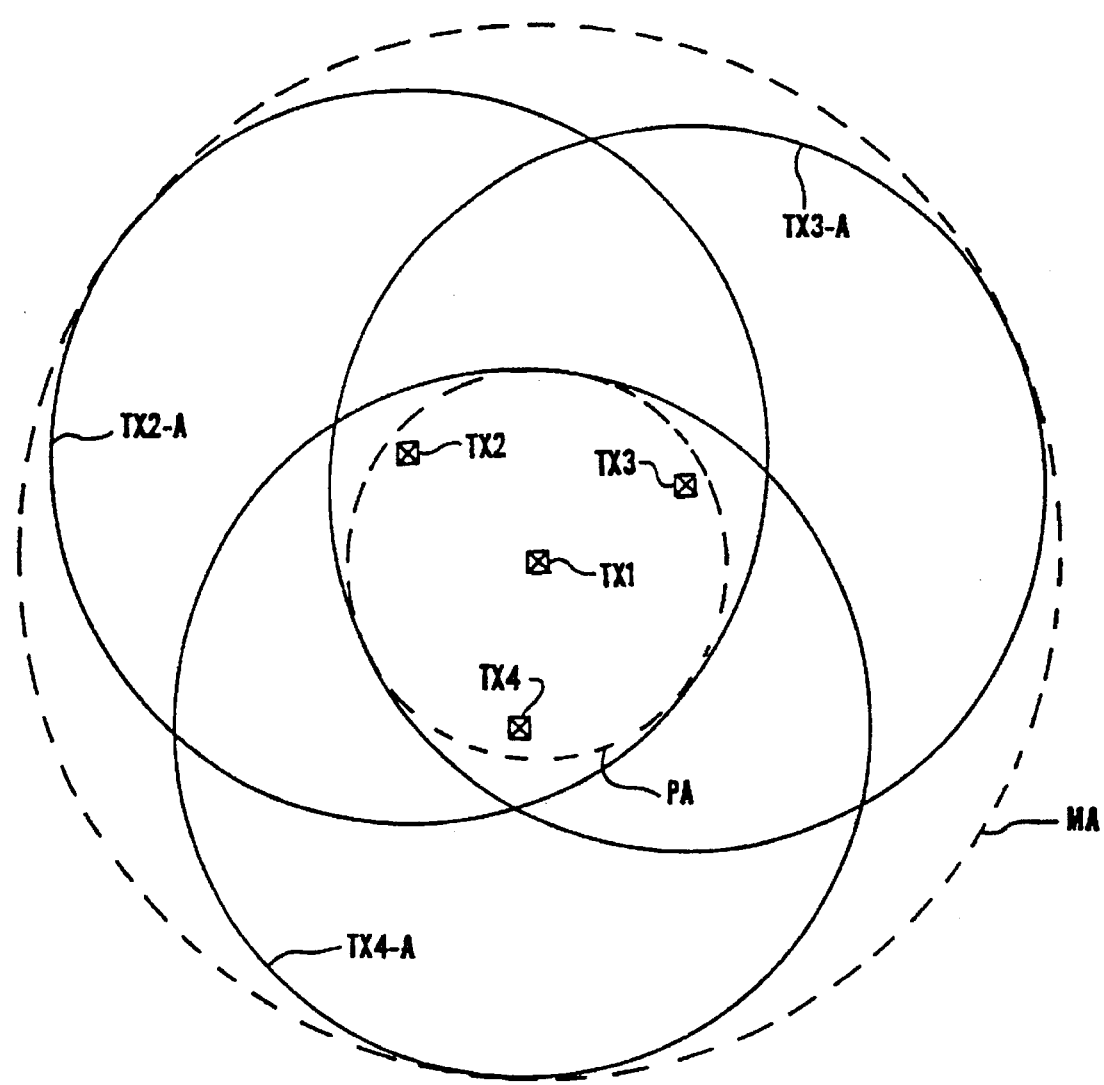
FIGS. 4 and 5 depict exemplary propagation areas for simulcast transmissions into a receiving area, in accord with the present invention.

Referring to FIG. 4, the circle PA defines the Protected Area or primary area which may be serviced from a transmitting antenna TX1. At the present the radius of this circle is 15 miles. However, usable signal and acceptable reception generally occurs to a radius of 40 miles which is here defined by the circle MA indicating the Maximum Area. The region between the 15 mile radius and the 40 mile radius forms a 'secondary' service area. According to the invention, all or part of the rights of the educational institution for ITFS service are leased. Also, licenses are aggregated, from companies currently licensed to use MMDS channels. Existing analog services (both ITFS and MMDS) are replaced by the new service which will provide the original programming desired by the ITFS institution in addition to a multiplicity of programs made possible by the system and method of the invention. In order to achieve this end, simulcasting is utilized in a unique manner.

Figure 1A:
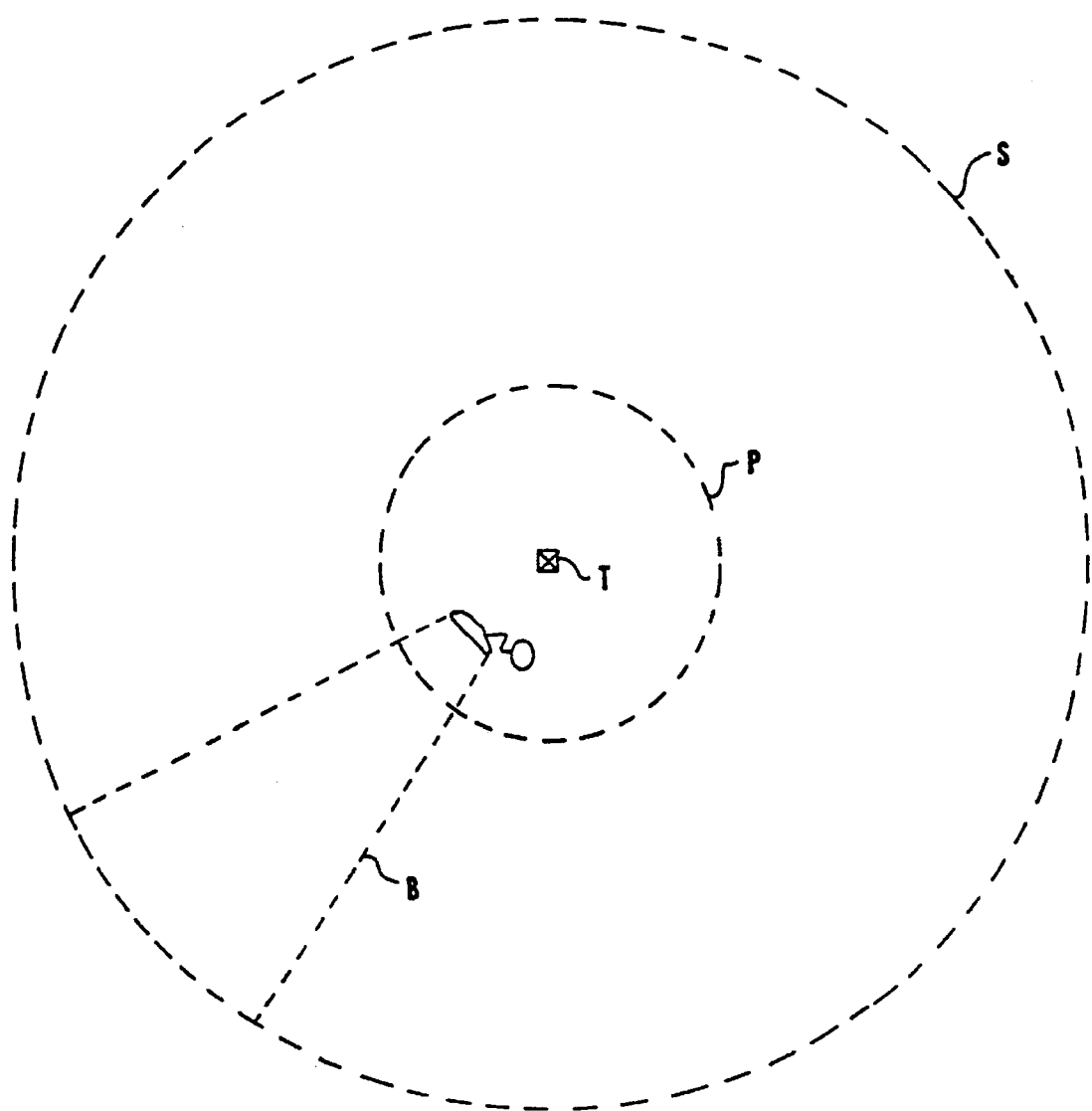
FIG. 1A shows service areas relating to a single wireless transmitter in the system of FIG. 1.

Referring to FIG. 4 there is shown one preferred embodiment of a simulcast arrangement utilizing the original antenna TX1 in addition to antennas TX2, TX3 and TX4 disposed in a generally triangular configuration within or on the boundary of the Protected Area (PA). According to this embodiment of the invention, all antennas radiate in an omni-directional pattern in azimuth as indicated by the circles TX2-A, TX3-A and TX4-A. The central antenna TX1 radiates out to the maximum area MA, in a manner permitted by existing regulations, as discussed above relative to FIG. 1A. A major portion of the protected area (PA) is overlapped by the signals from all antennas TX1, TX2, TX3 and TX4. In the Maximum Area (MA) considerable overlap continues to exist but to a lesser extent. In this manner it has been found possible to reach receivers in approximately 90–95% of the maximum area (MA).

Figure 2:
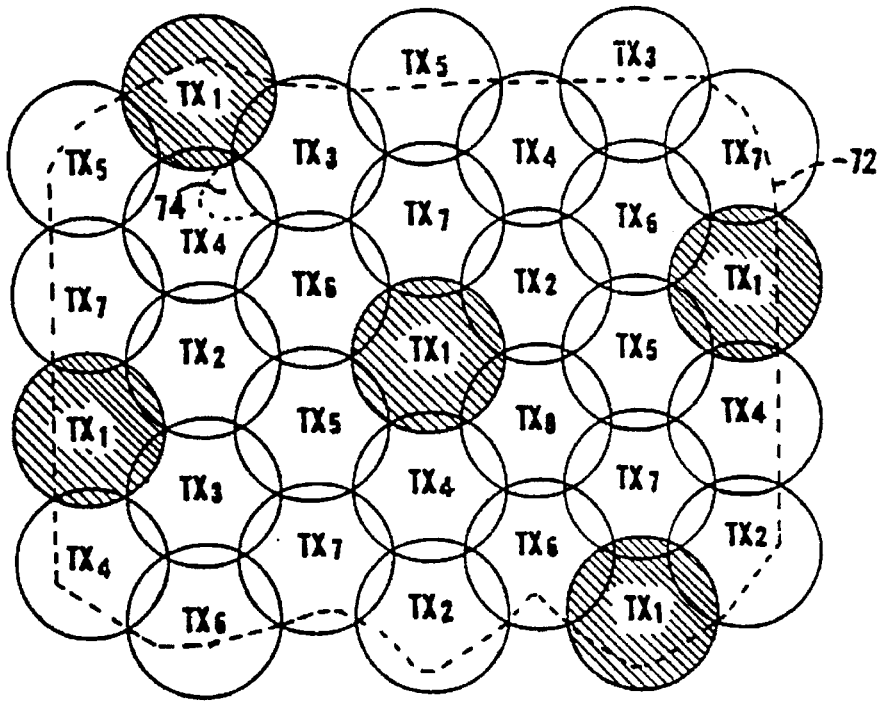
FIGS. 2 and 3 show propagation areas for multi-transmitter systems used in other types of prior art systems, e.g. paging.
Figure 3:
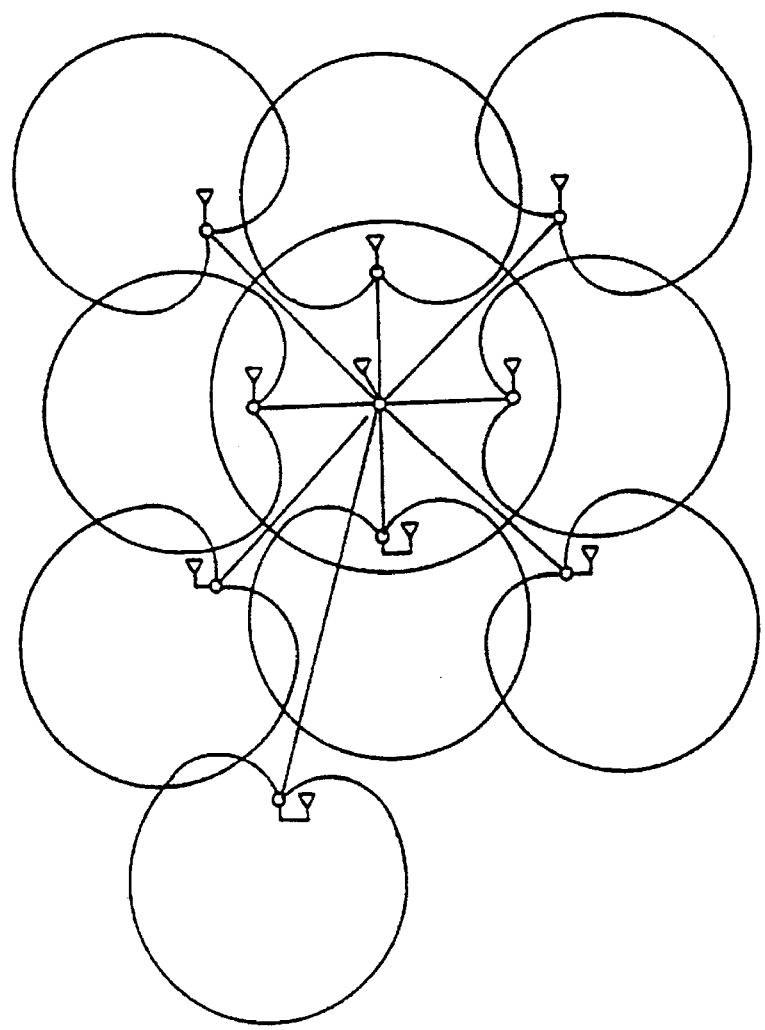
Figure 5:
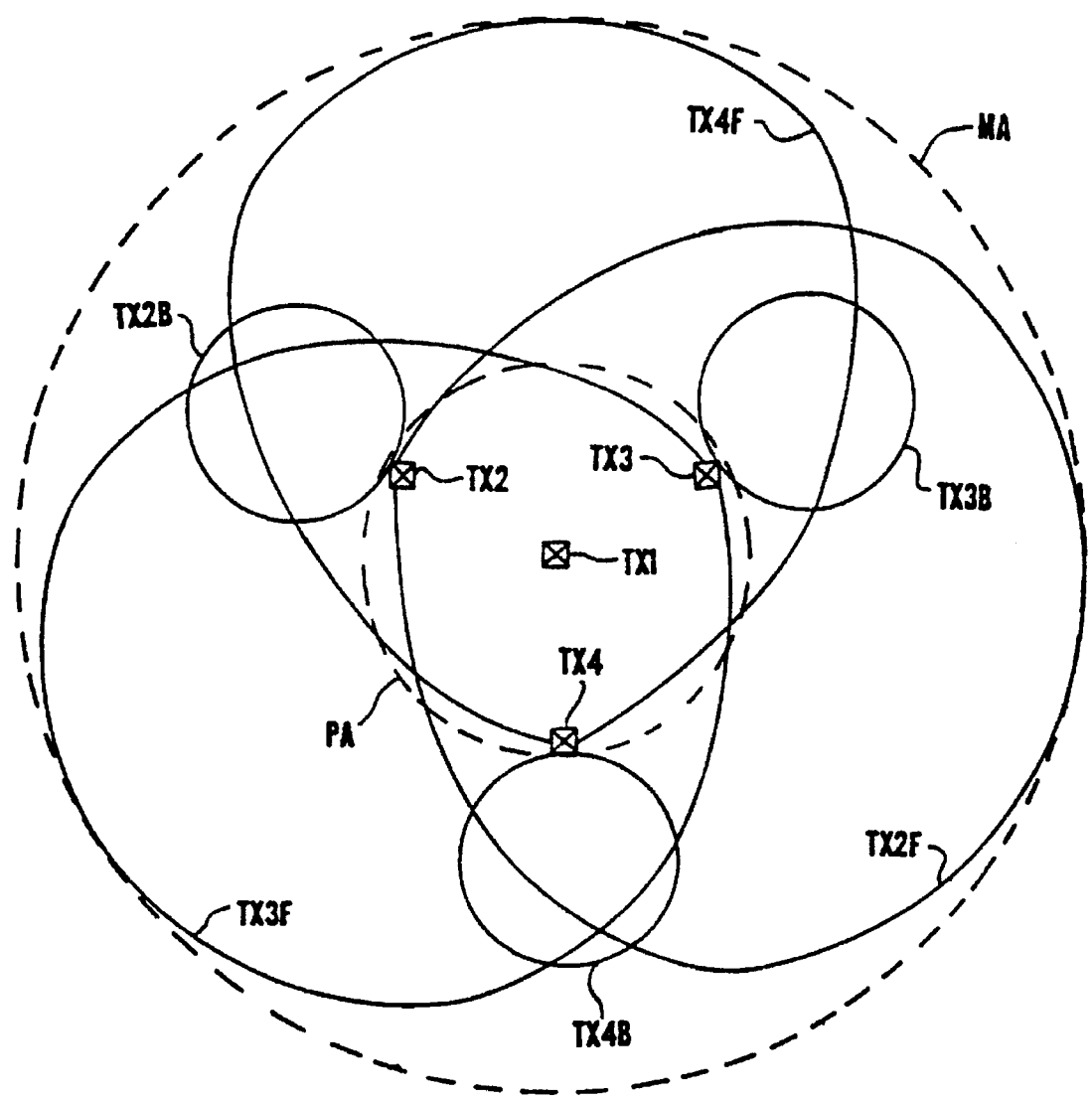

Referring to FIG. 5 there is shown a second preferred embodiment of simulcasting utilizing directional antennas TX2, TX3 and TX4. In this embodiment the central antenna TX1 retains its omni-directional pattern. However, the antennas TX2, TX3 and TX4 are provided as directional antennas radiating forward and backward lobes TX2F and TX2B for antenna TX2, TX3F and TX3B for the TX3 antenna and TX4F and TX4B for the TX4 antenna. In both the embodiments of FIGS. 4 and 5 it will be seen that there is a radical departure from the minimum overlap approach which is conventional in the systems illustrated in FIGS. 2 and 3.

The simulcast transmission from the broadcast antennae include a plurality of frequency multiplexed channels. Each channel contains a digital transport stream carrying a number of programs, in compressed digital form. The programs may be audio only programs, or data, but in the preferred embodiments, the programs are television type programs. The television type programs contain video and audio information, and may include data information, e.g. for closed captioning and the like. The system and method for transmitting the simulcast signals and receiving those signals within the service area are now briefly described.

Figure 6:
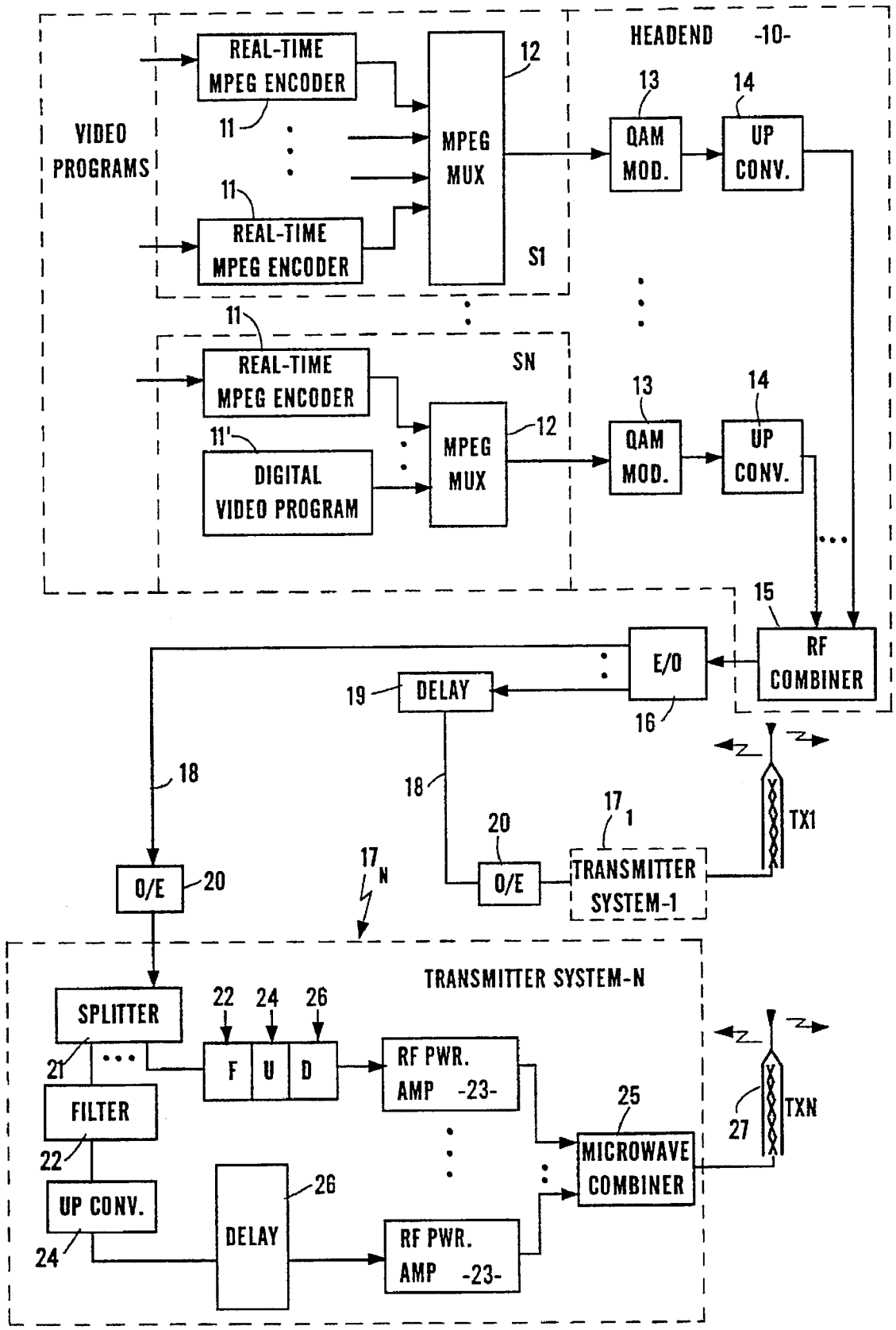
FIG. 6 depicts in functional block diagram form the elements of the transmission system used in accord with the present invention.

With reference to FIG. 6, the broadcasting portion of the system includes a headend 10. The headend includes a number of Sources S1 to SN for producing digital transport streams, each of which contains a plurality of programs encoded as digital, compressed data. The number of such sources corresponds to the number of frequency channels available for use in a particular geographic region. Typically, the FCC licenses up to 33 channels of MMDS and ITFS services in a given area. It may be possible to aggregate rights to use all such channels, but to provide a commercially viable service, typically only 20–25 such channels are necessary. The headend 10 therefore typically comprises 20–25 of the Sources S1 to SN, but may include as many as 33 such sources. The Sources S1 to SN may convert analog program information from video sources, (e.g. off-the-air feeds, satellite receivers, VCRs, etc.) into compressed, digital data form. The headend 10 may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG II encoding. FIG. 6 illustrates the overall architecture of the broadcasting system. As part of the headend 10, that figure provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG II standard provides a standardized format for packetizing the compressed audio and video information and for transporting other data. Under the MPEG II standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into 4000 transport packets.

Each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

Periodically, the transport packet for each program will also include a program reference clock (PRC) value within the optional adaptation field. In a typical 6 Mbits/s MPEG encoding system, the PRC is present in only 10 out of every 4000 video transport packets.

When included, the optional adaptation field includes a section for miscellaneous flags, such as discontinuity counter, private data flag, etc. One of the possible flags carried in this portion of the adaptation field is a program clock reference (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames.

The MPEG II standard facilitates time division multiplexing of MPEG packets from a plurality of programs. In the present system, the encoders 11 supply MPEG packets streams for multiple programs to an MPEG multiplexer 12. The number of programs may vary depending on the bandwidth. The MPEG multiplexer 12 may receive digitized and compressed (MPEG) video from other sources 11'. Typical digital sources 11' include digital server (storage) systems and digital video transmission systems (e.g. satellite or optical fiber).

As discussed below, a typical multiplexed digital transport packet stream used in the present invention has 27 Mbits/s of capacity. A mixture of program streams for individual programs at different individual rates, e.g. 1.5 Mbits/s, 3 Mbits/s and 6 Mbits/s, are combined to fully utilize the 27 Mbit/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG II packet streams of four such programs for output on each broadband rail.

The simplified example therefore provides four programs for one RF channel, i.e. a 4 to 1 improvement over the existing single analog program channel. The other mix of three 6 Mbits/s programs and three 3 Mbits/s programs provides six programs for one RF channel, i.e. a 6 to 1 improvement. Lower bit rates and/or more efficient modulation techniques can further extend the program capacity provided through each RF channel.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets containing video, audio and/or data from the particular source.

In a combined MPEG packet stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) channels associated with the HBO program. The program map for Showtime in the packet with PID 87 would then identify the PID numbers for the actual packetized elementary streams (PES) for the video, audio and data (if any) channels associated with the Showtime program.

In the present embodiment, each multiplexer 12 outputs a group of MPEG encoded programs, i.e. four if the encoding rate of all encoders 11 is 6 M bits/s, at a combined payload rate of 27 Mbits/s (it may be necessary to pad the steam with dummy packets to reach the full 27 Mbits/s). The MPEG II standard also requires that a packet stream containing packets relating to one or more programs includes a program association table in a packet identified by PID O. The program association table maps each program number with the PID value associated with the program map related to that source. In accord with the standard, each MPEG II multiplexer 12 combines MPEG packet streams for the four (or more) input programs and adds a PID O packet containing the program association table to the combined stream. In the above example, the program association table would map program number '1' (HBO) with PID value 132 indicating that the program map for HBO is contained in repeating packets identified by PID 132. Similarly, the program association table would map program number 's' (Showtime) with PID value 87 indicating that the program map for Showtime is contained in repeating packets identified by PID 87.

As discussed in more detail below, reception of a particular digital program requires that the CPE terminal device know the RF channel transporting the program and the program number (PN) associated with the program. The decoder uses the information contained in the PID O packet to identify the PID value for the program map for the particular desired program, e.g. 132 in the above HBO example, and uses the program map to identify the PID values needed to capture the video, audio and user data (if any) for the desired program.

The 27 Mbits/s baseband digital output of each MPEG multiplexer 12 from one of the sources S1 to SN goes to a modulator 13. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a cable television type distribution network. The currently preferred implementation uses 64 QAM (quadrature amplitude modulation) or 16 VSB (vestigial sideband) modulation techniques in the modulators 13.

Using 64 QAM, 4 channels of 6 Mbits/s or a mix of 1.5, 3 and 6 Mbits/s encoded digital video information up to a total of 27 Mbits/s can be modulated into one 6 Mhz bandwidth analog channel. Similarly, 256 QAM or 16 VSB would yield up to 40 Mbits/s of capacity, e.g. for 6 channels of 6 Mbits/s or mixes of the various rate encoded digital video information modulated into one 6 Mhz bandwidth analog channel. Each modulator 13 produces a 6 Mhz bandwidth output at an intermediate carrier frequency.

Each modulator 13 outputs the intermediate frequency signal to an individual upconverter 14. The upconverter converts the frequency of the QAM modulated signal up to one of up to thirty-three RF channel frequencies in the 50–450 MHz range. The upconverter 14 may be an element of the QAM modulator 13 or a separate element as shown hard wired to process the output of the QAM modulator. Each upconverter 14 outputs a different 6 MHz bandwidth RF channel to an RF combiner 15 for combining with the other 6 MHz RF signals from the other upconverters 14. The RF combiner 15 thereafter outputs the combined RF signals in the normal video channel range of approximately 50–450 Mhz. The upconverters 14 and the RF combiner 15 may be the same as components currently used for RF signal processing in cable television systems.

A transmission network supplies the combined spectrum signal in the UHF range from the combiner 15 to a number of transmitter systems $17_1$ to $17_n$. The transmitter systems $17_1$ to $17_n$ correspond to the transmitters TX1 to TX4 described above with respect to FIGS. 4 and 5. Although coaxial cable, wireless microwave relay transmissions or other media could be used, in the preferred embodiment, the transmissions from the headend 10 ride on optical fiber lines 18. In the preferred embodiment, an electrical to optical converter system 16 converts the signal from combiner 15 into optical signals for transmission over a plurality of optical fibers 18. An optical to electrical unit 20 at each transmitter site converts the optical signal back to the combined electrical signal and supplies that signal to one of the transmitter systems.

An important feature of the present invention relates to simulcasting, i.e. simultaneous broadcasting, of the combined spectrum UHF signal from all of the transmitter towers TX1 to TXN. The optical fiber signal transmission from the headend 10 to the transmitter systems requires some finite amount of time. Typically, the transmitter systems will not be equi-distant from the headend. In fact, one of the transmitter systems may be in the same building as the headend. To insure simultaneous broadcasting, the system shown in FIG. 6 therefore includes some form of delay 19 in one or more of the transport lines 18. The delay may take the form of coils of fiber to equalize the optical transport paths and therefore the time through each path. Alternatively, one or more electronic delay devices may be imposed in the relevant paths, either at the headend prior to optical transport or at the respective transmitter location subsequent to conversion back to electrical signal form.

There may be as few as two transmitters. In a typical example, there will be a central transmitter site TX1 and two or three other transmitter sites TX2, TX3 and TX4 at various locations about the primary reception area (see e.g. FIGS. 4 and 5). The headend may be close to the central transmitter site TX1, therefore the transport distance to that site would be the shortest. Assume now, for example, that TX4 is the longest distance from the headend. The delay produced by delay device 19 will be equal to the difference in the time required to transport optical signals from the headend to those two sites, i.e. so as to result in simultaneous in-phase transmission of the exact same signal from the antennae at the two transmitters TX1 and TX4. Similar delays are imposed in the lines 18 to the other transmitter systems.

FIG. 6 also shows details of one of the transmitter systems 17N, by way of an example. Each transmitter system includes a splitter 21. The splitter 21 together with associated channel selection filters 22 divide the received combined signal (50–450 MHz) into its constituent GMHz wide RF channels. For each 6 MHz channel in the 50–450 MHz range, one of the upconverters 24 converts that channel into one of the up to thirty-three available (licensed) channels in the UHF microwave range. An RF power amplifier 23 amplifies each UHF channel.

A delay device may process each channel signal, and by way of example, FIG. 6 shows a delay device 26 processing the output of each of the upconverters 24. The delay devices 26 provide precise delay compensation on each respective channel to compensate between variations in throughput processing time of the various components at different transmitter sites operating on the signal to be broadcast on a particular microwave channel.

A microwave combiner 25 combines the UHF channel signals back into a combined spectrum signal in the UHF range and supplies that signal to a microwave broadcasting antenna 27. Each transmitting antenna may be an omni-directional antenna or a directional antenna. The type of antenna at each transmitter site is selected to give the optimum coverage in a particular geographic service area. The antenna 27 emits UHF waves to propagate through a portion of the service area. For each channel, the resultant broadcasts from all of the transmitters are synchronized and in phase with each other. The transmitted microwave signals propagate into substantially overlapping portions of the service area and into some non-overlapping portions of that area, for example in patterns such as shown in FIGS. 4 and 5.

The above discussion of the headend and transmission systems is one example of an overall system for providing the simultaneous, synchronized, in-phase broadcasts from multiple transmitters having substantially overlapping propagation areas. Other headend and transmitter systems could be used. For example, the headend 10 could perform the digital multiplexing, and the transport network to the transmitters TX1 to TXN could carry the multiplexed transport streams in digital form. In such a case, the individual transmitter systems would further include at least the QAM modulators for each RF channel. In such a system, the transmitters may include means to synchronize processing and broadcast transmissions to some common clock, e.g. from a geo-positioning type satellite system, to achieve the simulcast transmission.

Figure 7:
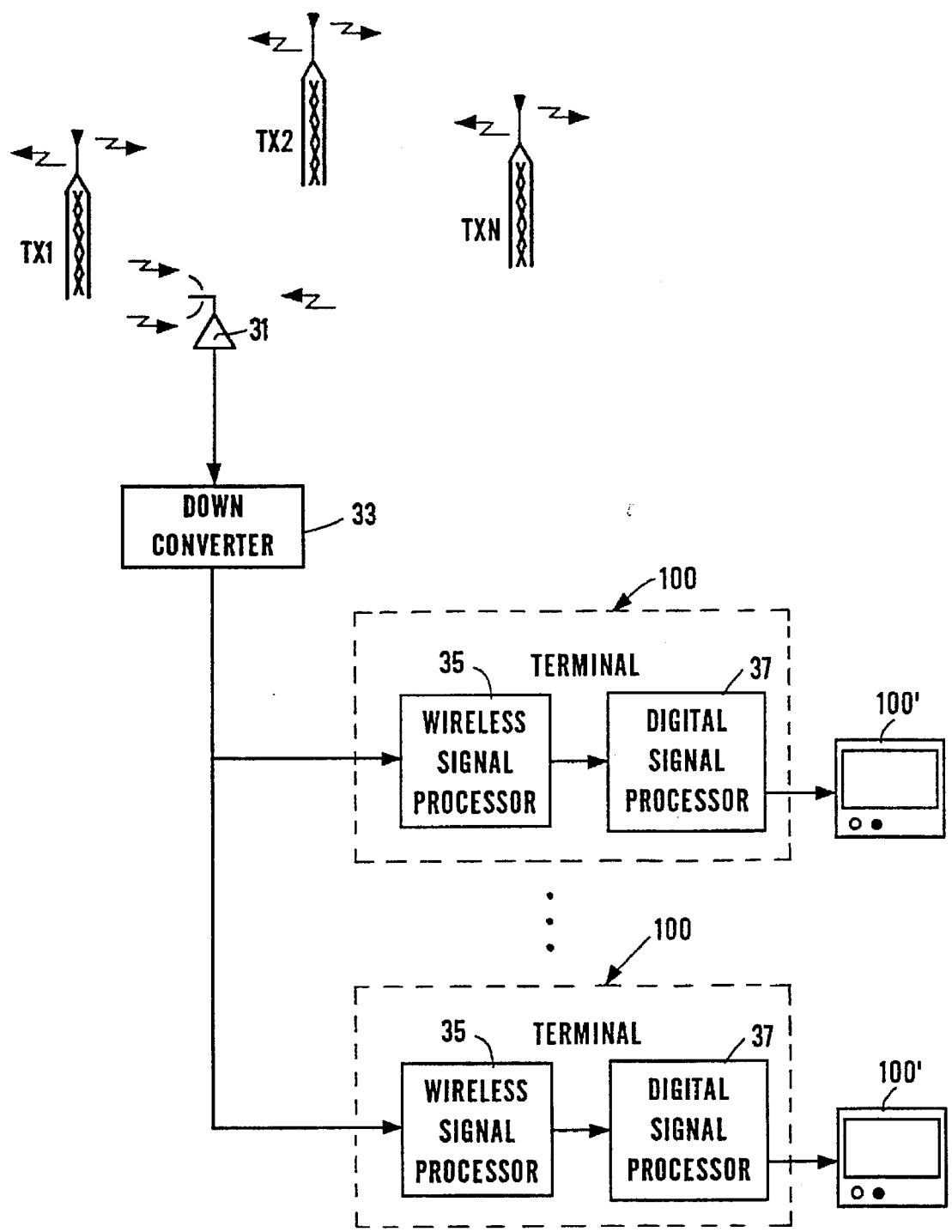
FIG. 7 illustrates the functional elements of a customer premises receiver system used in accord with the present invention.

FIG. 7 provides a high-level functional diagram of a receiving system at one subscriber's premises. Each subscriber has a receiving antenna 31. In accord with the preferred embodiment, the receiving antenna 31 is a directional antenna. At most potential receiving sites, it will be possible to aim the antenna 31 toward at least one of the transmitters and receive line-of-sight transmissions therefrom. Transmissions from one transmitter, e.g. TX2, may be blocked by an obstruction (not shown), but line-of-sight transmissions from at least one of the other transmitters, such as TX1, is more likely to be unobstructed.

At installation, the directional antenna 31 is aimed at the one transmitter TX1 to TXN which produces the strongest received signal through the antenna at the subscriber's particular location. Even so, the antenna receives multiple copies or replicas of the transmitted waveform signals. These multiple copies include a primary direct line-of-sight transmission of a signal from the transmitter the antenna is directed towards together with delayed copies (typically attenuated and distorted) caused by reflections of the transmissions from one or more of the multiple broadcast sites. Also, at locations in the secondary reception area, the direction of reception by the antenna 31 may actually be substantially in line with two of the transmitters. In such a case, the antenna would receive a first copy of the combined spectrum transmission from the closest transmitter followed by a delayed copy transmitted from the more distant of the two aligned transmitters.

The present invention therefore contemplates inclusion of some form of delay processing in the receiver to compensate for the reception of multiple delayed copies of the transmitted program signals. The presently preferred embodiment discussed below utilizes a delay equalizer. As an alternative, the processing circuitry could utilize spread spectrum technology.

The receiving antenna 31 supplies the 2.6 GHz spectrum (through appropriate filtering not shown) to a block down-converter 33. The block down-converter converts the 2.6 GHZ signal, containing all of the RF channels, back down to the video channel band of 50–450 MHz. The block down-converter supplies the 50–450 MHz combined spectrum signal via a coaxial cable to one or more terminal devices 100 located at various places in the subscriber's home. Each terminal 100 includes some form of wireless signal processor 35 for processing a selected one of the 6 MHz channels to recover the digitally multiplexed transport stream carried in that channel. Each terminal connects to an associated television set 100'. The digital signal processor 37 processes data packets for the selected program from the multiplexed stream to produce signals to drive the TV 100' The TV '100' presents the program to the viewer in sensorially perceptible form, in this case, as a standard audio/visual output.

Figure 8:
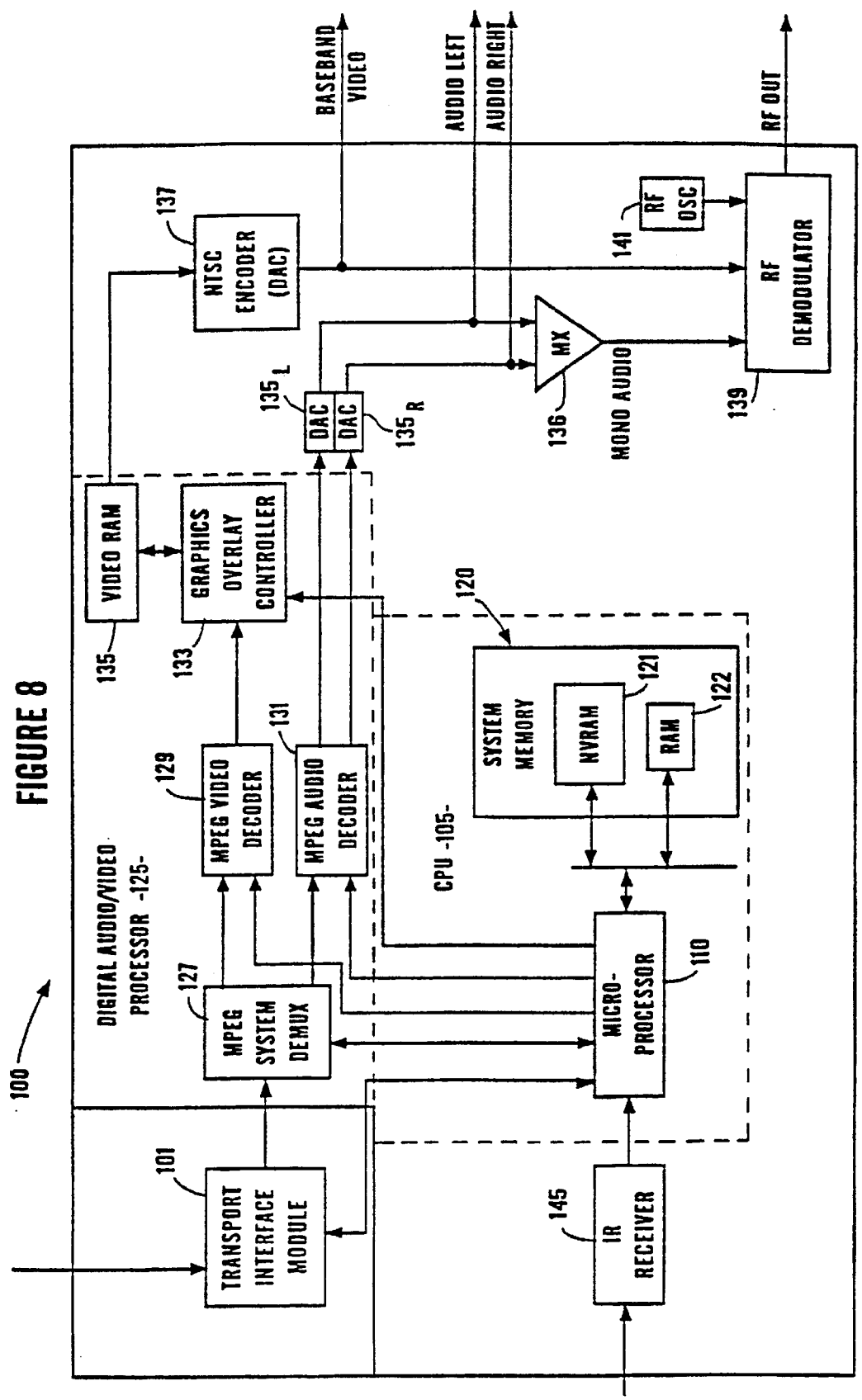
FIG. 8 illustrates in block diagram form the elements of one terminal device used in the system of FIG. 7.

FIG. 8 illustrates the functional elements of the terminal 100. In this embodiment the terminal 100 is a digital entertainment terminal, or 'DET.' The DET 100 will include a transport interface module (TIM) 101 providing the actual physical connection to the coaxial cable network in the subscriber's premises. The transport interface module (TIM) 101 will also perform the format conversion necessary between signal formats utilized by the network and signal formats used within the digital processing portion of the DET 100. In the present invention, the TIM performs RF tuning and QAM demodulation. If the programming is encrypted, the TIM also includes the necessary decryption circuitry. The TIM 101 therefore serves as the wireless signal processor 35. The main portion of the DET 100 serves as the digital signal processor 37.

In the illustrated embodiment, the transport interface module (TIM) 101 presents two connections to the rest of the DET, a high bit rate broadband connection for received broadband signals and a low bit rate signaling connection to permit control and monitoring of the TIM by a microprocessor within the main portion of the DET. For a selected channel, the TIM hands off the 27 Mbits/s baseband digital transport stream captured from that RF channel to the main portion of the DET. The structure of the TIM 101 is described in more detail below with regard to FIG. 9.

The DET 100 includes a CPU 105, comprising a 386, 486 or Pentium microprocessor 110 and associated system memory 120. The system memory 120 includes at least 2 mbytes of volatile dynamic RAM 122 and 1 mbyte of non-volatile RAM 121. The microprocessor 110 includes a small amount of ROM (not shown) storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the transport interface module (TIM) 101 and routes the packets having predetermined PID values to the appropriate components of the DET. For example, under CPU control, the MPEG system demultiplexer 127 circuitry recognizes audio and video packets in the MPEG data stream as audio and video relating to a selected program and routes those packets to the decoders 129, 131, respectively. The MPEG system demultiplexer circuitry 127 route packets having specified PID values identified as user data packets to the CPU 105 for further processing. The MPEG system demultiplexer circuitry 127 recognizes program map packets (and program association packets if necessary) and supplies those packets to the CPU 105.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as the initial turn-on selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video fame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overlay controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user. In the embodiment illustrated in FIG. 1, the DET 100 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on applications programming and/or operating system software stored in the system memory 120. For example, in response to certain input commands, the microprocessor 110 may control a cursor position and display received user data in the form of alphanumeric information displayed as graphics and text on the associated television set 100' The microprocessor 110 will also respond to an appropriate input command from the user to select a broadcast program as discussed in more detail below.

Figure 9:
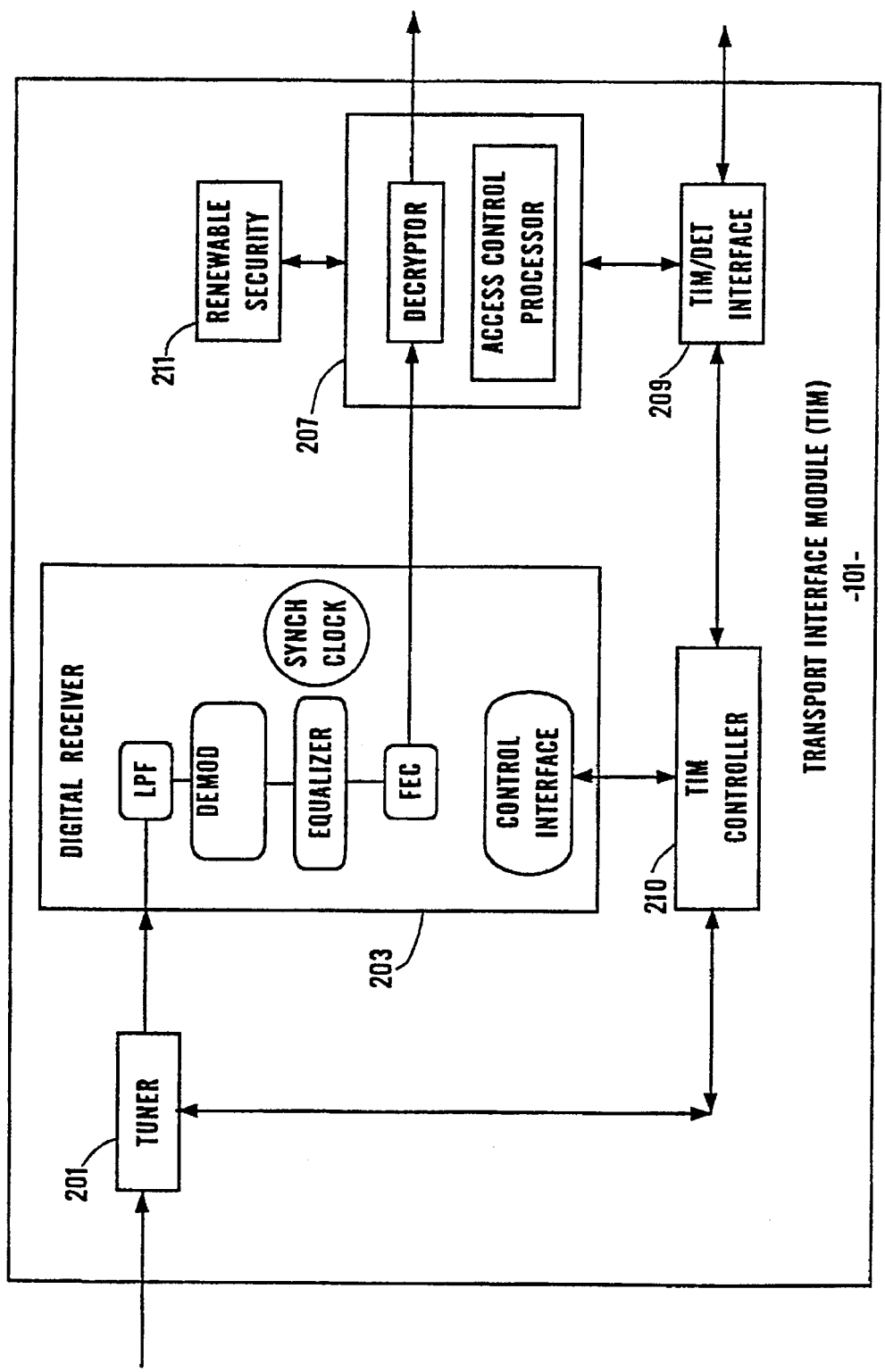
FIG. 9 is a block diagram illustration of the elements of a transport interface module used in the terminal of FIG. 8.

FIG. 9 depicts in block diagram form the structure of a TIM 101. The structure illustrated is based in part on the current preference for the 64 QAM modulation techniques for the digital video signals in transmission system of the type shown in FIG. 6. The input to the TIM is a broadband RF signal in the 50–450 MHz range provided from a coaxial cable from the down converter. The tuner 201 selects a specific 6 MHz channel from the broadband input spectrum and presents it at an intermediate frequency to the digital communications receiver section 203.

The digital receiver 203 includes a low-pass filter, a demodulator (e.g. 64 QAM), a time domain adaptive digital equalizer, and forward error correction circuitry. A clock circuit provides synchronization for the digital output of the demodulator, the adaptive digital equalizer, and the forward error correction circuitry.

The time domain adaptive digital equalizer receives the output of the QAM demodulator. Because of the overlapping transmissions from multiple transmitter sites and/or because of multi-path delays, i.e. reflections of signals transmitted from one or more broadcast sites, the output of the demodulator will not be a clean digital pulse stream. Instead, the signal will be a composite of time delayed copies of the transmitted digital information. The time domain adaptive equalizer includes a multi-tap digital delay line. The outputs from the taps of the delay line may be weighted and summed, and the sum processed by a level detector or the like to recapture the original symbols (e.g. 1s and 0s of a digital stream). Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used. The forward error correction circuit processes the recaptured symbols (e.g. 1s and 0s) to determine if each is in the proper position in the stream.

A control interface provides appropriate control signals to the elements of the digital receiver 207 in response to instructions from the transport interface module (TIM) controller 210. The digital receiver processes signals selected from one of the RF channels by operation of the tuner 210 to capture one of the digital transport streams (e.g. 27 Mbits/s payload assuming 64 QAM). The digital processor outputs the transport stream as a corrected serial baseband digital feed.

A decryption module 207 is optional. If included, this module controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. When properly authorized, the decryptor in module 207 decrypts payload data within packets of a selected program in the transport stream. The composite MPEG transport multiplex with appropriately decrypted components for the selected program is output from the TIM 101 to the host DET's demultiplexer 127 and decompression circuitry as shown in detail in FIG. 8. The TIM controller 210 and/or the decryption module 207 receive instructions from the CPU 105 (FIG. 8) as to channel and program selections via the TIM/DET interface 209.

The system memory 120 of the main portion of the DET 100 will store a channel map for the digital broadcast programs available through the system. For each program service, the map includes information defining a logical network channel number for the program. The logical channel number is the channel the DET will display on a front panel display (not shown) or on the screen of the associated television set 100' and is the number that the user inputs via the remote control to select the program. For each program, the map also includes RF channel information needed to tune to the RF channel carrying the program and the program number (PN) uniquely identifying the program within the multiplexed digital transport stream.

When the user selects a digital broadcast program, the microprocessor 110 in the main portion of the DET accesses the listing for that channel in the channel map stored in the system memory 120. The microprocessor 110 supplies a message containing the RF channel number and the program number (PN) to the TIM controller 210 via interface 209. In response to the RF channel number, the TIM controller 210 activates the tuner 201 to tune to the identified channel. If the program is encrypted, the TIM uses the program number, the program association table in the packet identified by PID 0 and the program map to identify the packets carrying audio, video and data (if any) for the program. If authorized to receive the program as indicated via the renewable security device 211, the decryption module 207 uses a decryption key from its memory or from the renewable security device 211 to descramble the information in the payloads of the packets of the selected program. As a result, the TIM 216 passes digital signals from the RF channel through the interface to the MPEG system demultiplexer 129 in the main portion of the DET wherein at least the information for the selected program is now in unencrypted form.

The MPEG demultiplexer 127 supplies information from the PID 0 packet, i.e. the program association table to the CPU 105. The microprocessor 110 uses the program number (PN) from the channel map stored in system memory 120 to identify the PID value for the correct program map from the program association table. The CPU 105 supplies that PID value to the MPEG demultiplexer 127. When the MPEG demultiplexer 127 receives a packet containing that PID, it supplies information from the packet identified by the PID (the program map) to the CPU. From the program map, the CPU identifies the PID values for the video and audio for the program and instructs the demultiplexer 127 to supply those packets to the respective MPEG decoders 129,131 to begin MPEG decoding of the selected program for presentation to the user via the associated television set 100'.

The above discussion has concentrated on the preferred embodiment which broadcasts video programming. It should be noted, however, that the system may transport other types of programming, such as audio, data and/or telemetry.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A radio frequency simulcasting method for transmitting information from multiple spaced transmitting sites to multiple receiving sites in a reception area, the method comprising the steps of:

a) simultaneously transmitting from said transmitting sites the same signal so that areas of propagation from respective ones of the transmitting sites substantially overlap over each other in at least a major portion of said reception area, said signal transmitted from said transmitting sites including multiplexed channels, b) receiving a signal containing a plurality of time delayed copies of said transmitted signal at one of the receiving sites;

c) processing at least a portion of the received signal to acquire a single signal corresponding to a selected one of the multiplexed channels; and (d) presenting information contained in the acquired signal.

2. A method as in claim 1, wherein the step of processing comprises:

demodulating a selected one of the multiplexed channels to produce a demodulated signal; and delay equalizing the demodulated signal.

3. A method as in claim 1, wherein:

each multiplexed channel includes a multiplexed stream of digital data representing a plurality of programs; and the presenting step comprises (a) selecting from the acquired signal the information for one program from the multiplexed stream of digital data, and (b) reproducing the selected information as sensorially perceptible information.

4. A method as in claim 1, wherein the simultaneous transmissions from said transmitting sites are synchronized and in phase with each other.

5. A communication system comprising:

a headend producing a signal including multiplexed channels;

a plurality of transmitters located at spaced apart sites transmitting said signal so that areas of propagation from respective ones of the transmitters substantially overlap over each other in at least a major portion of a reception area; and a receiver system located within the reception area, said receiver system comprising:

(1) an antenna receiving a plurality of time delayed copies of the transmitted signal;

(2) a delay equalizer processing at least a portion of the received signal to acquire a single signal corresponding to a selected one of the multiplexed channels; and (3) a processor presenting information contained in the acquired signal.

6. A communication system as in claim 5, wherein said headend comprises:

a source of a first digital multiplexed data stream containing digitized data representing a first group of programs;

a source of a second digital multiplexed data stream containing digitized data representing a second group of programs;

a modulation system modulating the first digital multiplexed data stream and the second digital multiplexed data stream into first and second channels, respectively.

7. A communication system as in claim 5, further comprising a transmission network between the headend and the transmitters for transmitting a first copy of the signal including multiplexed channels through a first path to arrive at a broadcast antenna at a first one of the transmitter sites after a known time period, and for transmitting and delaying a second copy of the signal including multiplexed channels through at a second path to arrive at a broadcast antenna at a second one of the transmitter sites after said time period.

8. A communication system as in claim 7, wherein the transmission network comprises optical fibers connected between the transmitters and the headend.

9. A communication system as in claim 5, wherein said receiver system further comprises:

a channel selector selectively outputting signals from one of the channels;

a demodulator responsive to the selectively output signals for supplying a demodulated signal to the delay equalizer.

10. A communication system as in claim 5, wherein said processor comprises:

a demultiplexer for selecting predetermined digital data from the acquired signal; and a decoder processing the predetermined digital data to produce a signal for driving an output device.

11. A communication system as in claim 5, wherein said receiver system further comprises an output device responsive to information presented by said processor to output information to a user in sensorially perceptible form.

12. A communication system as in claim 11, wherein said output device comprises a video display.

13. A communication system comprising:

a source of a first digital multiplexed data stream containing a plurality of packet streams, each packet stream carrying digitized data representing one of a first group of programs;

a source of a second digital multiplexed data stream containing a plurality of packet streams, each packet stream carrying digitized data representing one of a second group of programs;

a modulation system modulating the first digital multiplexed data stream and the second digital multiplexed data stream into first and second channel signals, respectively;

a plurality of wireless transmitters located at respective different sites in a service area, the transmitters simultaneously transmitting a combined wireless signal containing the first and second channel signals into overlapping portions of the service area; and a plurality of receivers within the service area, each receiver comprising:

(i) an antenna for receiving a received wireless signal from at least one of the transmitters, (ii) an interface module processing the received wireless signal to select one of the first and second channel signals and acquire a digital multiplexed data stream from the selected channel signal, and (iii) a digital signal processing section for processing digitized data from a selected packet stream contained in the acquired digital multiplexed data stream to present a selected program.

14. A communication system as in claim 13, wherein the interface module comprises:

means for selectively receiving a wireless signal representing the one of the first and second channel signals; and means for demodulating the selectively received wireless signal.

15. A communication system as in claim 14, wherein the antenna at one receiver receives a plurality of differently time delayed wireless signals representing the first and second channel signals, the one receiver further comprising means for processing the received plurality of time delayed wireless signals to produce a single copy of the acquired digital multiplexed data stream.

16. A communication system as in claim 15, wherein the means for processing comprises a digital time delay equalizer within the interface module which receives an output of the means for demodulating and supplies the single copy of the acquired digital multiplexed data stream to the digital signal processing section.

17. A communication system as in claim 13, wherein at least one of the antennae is a directional antenna aimed at one of the transmitters.

18. A communication system as in claim 13, wherein at least one of the sources comprises:

a plurality of encoders responsive to audio information for producing packets of digitized, compressed audio data; and a multiplexer multiplexing packets of digitized, compressed audio data from the plurality of encoders into one digital multiplexed data stream.

19. A communication system as in claim 13, wherein at least one of the sources comprises:

a plurality of encoders responsive to video information for producing packets of digitized, compressed video data; and a multiplexer multiplexing packets of digitized, compressed video data from the plurality of encoders into one digital multiplexed data stream.

20. A communication system as in claim 13, wherein at least one of the sources comprises:

a plurality of encoders responsive to audio and video information for producing packets of digitized, compressed audio and video data; and a multiplexer multiplexing packets of digitized, compressed audio and video data from the plurality of encoders into one digital multiplexed data stream.

21. A communication system as in claim 13, wherein said modulation system comprises:

a first modulator for modulating the first digital multiplexed data stream into the first channel signal;

a second modulator for modulating the second digital multiplexed data stream into the second channel signal; and a combiner combining output signals from the first and second modulators into a combined spectrum signal and supplying the combined spectrum signal to each of the transmitters for transmission as said combined wireless signal.

22. A communication system as in claim 21, wherein each of the first and second modulators comprises a quadrature amplitude modulator and each wireless signal processing section comprises a quadrature amplitude demodulator.

23. A communication system as in claim 21, further comprising converter means for converting the first and second channel signals to microwave frequency range channels.

24. A communication system as in claim 13, further comprising a transmission network between the modulation system and the wireless transmitters for transmitting a first copy of the combined wireless signal through a first path to arrive at a broadcast antenna at a first one of the transmitters after a known time period, and for transmitting and delaying a second copy of the combined wireless signal through a second path to arrive at a broadcast antenna at a second one of the transmitter sites after said time period.

25. A communication system as in claim 24, wherein the transmission network comprises optical fibers connected between the transmitters and the modulation system.

26. A system as in claim 13, further comprising an output device connected to each receiver for producing a sensorially perceptible output to a user in response to the selected program.

27. A system as in claim 26, wherein the output device comprises a video display.

28. A system as in claim 13, wherein at least one of the wireless transmitters includes a delay device for delaying the first channel signal such that first channel signals in the transmissions from the wireless transmitters are synchronized and in phase.

29. A system as in claim 28, wherein at least one of the wireless transmitters includes a delay device for delaying the second channel such that second channel signals in the transmissions from the wireless transmitters are synchronized and in phase.

30. A simulcasting method for transmitting a signal from multiple transmitting sites to a primary reception area and to a secondary reception area wherein said transmitting sites are disposed to enclose at least a portion of said primary area, the method comprising the steps of:
 a) simultaneously transmitting from said transmitting sites the same signal so that the areas of propagation from said respective transmitting sites overlap over at least a major portion of said primary reception area and also cover a substantial portion of said secondary reception area;
 b) said signal transmitted from said transmitting sites including multiplexed channels each including multiplexed streams of digital data representing a plurality of programs;
 c) selecting at a receiving site (1) one of said multiplexed channels, and (2) from that channel selecting data from one of said multiplexed streams of digital data; and
 d) reproducing the selected data.

31. A method as in claim 30, wherein the step of simultaneously transmitting comprises:
 digitally encoding and multiplexing sensorially perceptible information for a first group of programs to form a first transport stream containing multiplexed streams of digital data;
 modulating the first transport stream into a first channel signal;
 digitally encoding and multiplexing sensorially perceptible information for a second group of programs to form a second transport stream containing multiplexed streams of digital data;
 modulating the second transport stream into a second channel signal;
 combining the first channel signal and the second channel signal; and
 supplying the combined first and second channel signals as at least a portion of said multiplexed channels to all of the transmitting sites for the simultaneous transmission.

32. A method as in claim 31, wherein:
 (1) the supplying step comprises:
  (i) transmitting a first copy of the combined first and second channel signals through a first path such that the combined first and second channel signals arrive at a first one of the transmitting sites after a known time period, and
  (ii) transmitting and delaying a second copy of the combined first and second channel signals through a second path such that the combined first and second channel signals arrive at a second one of the transmitting sites after said time period; and
 (2) the simultaneously transmitting step comprises broadcasting the first and second copies of the combined first and second channel signals from the first and second transmitting sites in phase with each other.

33. An RF frequency simulcasting method for transmitting video information from multiple spaced transmitting sites to multiple receiving sites in a reception area, the method comprising the steps of:
 a) simultaneously transmitting from said transmitting sites the same signal so that the areas of propagation from respective ones of the transmitting sites substantially overlap over each other in at least a major portion of said reception area;
 b) said signal transmitted from said transmitting sites including frequency multiplexed channels, each channel including multiplexed streams of digitized video;
 c) selecting video information at one receiving site, said selecting step comprising:
  (1) selecting one of said frequency multiplexed channels, and
  (2) selecting one stream of digitized video from the multiplexed streams contained in the selected channel; and
 d) processing the selected stream of digitized video to display the selected video information.

34. A method as in claim 33, wherein the step of simultaneously transmitting comprises:
 digitally encoding and multiplexing video information for a first group of programs to form a first transport stream;
 modulating the first transport stream into a first frequency channel signal;
 digitally encoding and multiplexing video information for a second group of programs to form a second transport stream;
 modulating the second transport stream into a second frequency channel signal;
 combining the first frequency channel signal and the second frequency channel signal into said frequency multiplexed channels; and
 supplying the combined first and second frequency channel signals to all of the transmitting sites for the simultaneous transmission.

35. A method as in claim 34, wherein:
 (1) the supplying step comprises:
  (i) transmitting a first copy of the combined first and second frequency channel signals through a first path such that the combined first and second frequency channel signals arrive at a first one of the transmitting sites after a known time period, and (ii) transmitting and delaying a second copy of the combined first and second frequency channel signals through a second path such that the combined first and second frequency channel signals arrive at a second one of the transmitting sites after said time period; and (2) the simultaneously transmitting step comprises broadcasting the first and second copies of the combined first and second frequency channel signals from the first and second transmitting sites in phase with each other.

36. A simulcasting method for transmitting a signal from multiple transmitting sites, the method comprising the steps of:

a) simultaneously transmitting from said transmitting sites the same signal so that the areas of propagation from said respective transmitting sites overlap;

b) said signal transmitted from said transmitting sites including multiplexed channels each including multiplexed streams of digital data representing a plurality of programs;

c) receiving at a receiving site a signal containing a plurality of time delayed copies of said transmitted signal;

d) processing at least a portion of the received signal to acquire a single signal corresponding to one of said multiplexed streams of digital data; and e) selecting digital data from the one multiplexed stream.

37. A method as in claim 36, wherein the step of simultaneously transmitting comprises:

digitally encoding and multiplexing sensorially perceptible information for a first group of programs to form a first transport stream containing multiplexed streams of digital data;

modulating the first transport stream into a first channel signal;

digitally encoding and multiplexing sensorially perceptible information for a second group of programs to form a second transport stream containing multiplexed streams of digital data;

modulating the second transport stream into a second channel signal;

combining the first channel signal and the second channel signal; and supplying the combined first and second channel signals as at least a portion of said multiplexed channels to all of the transmitting sites for the simultaneous transmission.

38. A method as in claim 37, wherein:

(1) the supplying step comprises:
 (i) transmitting a first copy of the combined first and second channel signals through a first path such that the combined first and second channel signals arrive at a first one of the transmitting sites after a known time period, and
 (ii) transmitting and delaying a second copy of the combined first and second channel signals through a second path such that the combined first and second channel signals arrive at a second one of the transmitting sites after said time period; and (2) the simultaneously transmitting step comprises broadcasting the first and second copies of the combined first and second channel signals from the first and second transmitting sites in phase with each other.

39. A method as in claim 36, wherein the step of processing comprises:

demodulating a selected one of the multiplexed channels to produce a demodulated signal; and delay equalizing the demodulated signal.

* * * * *

UNITED STATES PATENT AND TRADEMARK OFFICE
CERTIFICATE OF CORRECTION

PATENT NO. : 5,651,010
DATED : July 22, 1997
INVENTOR(S) : Bruce Kostreski et al.

It is certified that error appears in the above-identified patent and that said Letters Patent is hereby corrected as shown below:

On the title page, item [75] should read as follows:

--[75] Inventors: Bruce Kostreski, Wheaton Md.; Kamran Sistanizadeh, Arlington; W. Tim Campbell, Alexandria, both of Va.--

Signed and Sealed this

Fifth Day of October, 1999

Attest:

Q. TODD DICKINSON

*Attesting Officer*   *Acting Commissioner of Patents and Trademarks*